US012305594B2

United States Patent
Kawatsu et al.

(10) Patent No.: US 12,305,594 B2
(45) Date of Patent: May 20, 2025

(54) FAILURE DIAGNOSTIC SYSTEM FOR SPACECRAFT LIQUID PROPULSION SYSTEM AND FAILURE DIAGNOSTIC METHOD FOR SPACECRAFT LIQUID PROPULSION SYSTEM

(71) Applicant: JAPAN AEROSPACE EXPLORATION AGENCY, Tokyo (JP)

(72) Inventors: Kaname Kawatsu, Tokyo (JP); Ai Noumi, Tokyo (JP); Naoki Ishihama, Tokyo (JP); Taiichi Nagata, Tokyo (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 516 days.

(21) Appl. No.: 17/753,709

(22) PCT Filed: Feb. 2, 2021

(86) PCT No.: PCT/JP2021/003722
§ 371 (c)(1),
(2) Date: Mar. 11, 2022

(87) PCT Pub. No.: WO2021/157567
PCT Pub. Date: Aug. 12, 2021

(65) Prior Publication Data
US 2022/0341375 A1  Oct. 27, 2022

(30) Foreign Application Priority Data
Feb. 4, 2020  (JP) .................. 2020-017039

(51) Int. Cl.
*F02K 9/96* (2006.01)
*B64G 1/40* (2006.01)
(Continued)

(52) U.S. Cl.
CPC ............. *F02K 9/96* (2013.01); *B64G 1/401* (2013.01); *B64G 1/66* (2013.01); *F02K 9/42* (2013.01); *G01M 99/00* (2013.01)

(58) Field of Classification Search
CPC ..... F02K 9/96; F02K 9/42; F02K 9/00; F02K 9/56; B64G 1/66; G01M 99/00
See application file for complete search history.

(56) References Cited

U.S. PATENT DOCUMENTS

2013/0116937 A1  5/2013  Calhoun et al.
2017/0175680 A1  6/2017  Romet et al.
(Continued)

FOREIGN PATENT DOCUMENTS

JP  S6060399 A  4/1985
JP  S6090097 U  6/1985
(Continued)

OTHER PUBLICATIONS

International Search Report for Corresponding International Application No. PCT/JP2021/003722, 3 pages, Mar. 23, 2021.

*Primary Examiner* — Catherine T. Rastovski
*Assistant Examiner* — Brian Butler Geiss
(74) *Attorney, Agent, or Firm* — Lucas & Mercanti, LLP

(57) ABSTRACT

A failure diagnostic system for a spacecraft liquid propulsion system having a plurality of thrusters and a supply pipe connected to the thrusters, is used to diagnose a failure in the spacecraft. The system includes a pressure sensor that detects an inner pressure of the supply pipe as time-series data, a frequency spectrum conversion unit that converts the time-series data into frequency spectrum data, a storage unit that stores the frequency spectrum data generated based on an analytical model by computer simulation or a test result of a testing device as a data set, a comparator that compares the data set with the frequency spectrum data, and a deter-
(Continued)

mining unit that determines a failure in any one of the plurality of thrusters based on the comparison.

12 Claims, 12 Drawing Sheets

(51) Int. Cl.
  *B64G 1/66* (2006.01)
  *F02K 9/42* (2006.01)
  *G01M 99/00* (2011.01)

(56) References Cited

U.S. PATENT DOCUMENTS

2017/0328811 A1 11/2017 Mori et al.
2018/0292292 A1 10/2018 Takahashi et al.

FOREIGN PATENT DOCUMENTS

| | | |
|---|---|---|
| JP | 07-159231 A | 6/1995 |
| JP | 2002161800 A | 6/2002 |
| JP | 2007270682 A * | 10/2007 |
| JP | 2008033532 A | 2/2008 |
| JP | 2013545081 A | 12/2013 |
| JP | 2016151909 A | 8/2016 |
| JP | 2017524851 A | 8/2017 |
| WO | 2017078004 A1 | 5/2017 |

* cited by examiner

FAILURE DIAGNOSTIC SYSTEM FOR SPACECRAFT LIQUID PROPULSION SYSTEM AND FAILURE DIAGNOSTIC METHOD FOR SPACECRAFT LIQUID PROPULSION SYSTEM

CROSS-REFERENCE TO RELATED APPLICATIONS

This application is a 371 of PCT/JP2021/003722, filed Feb. 2, 2021, which claims the benefit of Japanese Patent Application No. 2020-017039, filed Feb. 4, 2020.

TECHNICAL FIELD

The present invention relates to a spacecraft liquid propulsion system and a failure diagnostic method for the spacecraft liquid propulsion system.

BACKGROUND ART

A liquid propulsion system used for a posture control of a spacecraft, such as an artificial satellite and an H-II Transfer Vehicle, is one of the most important systems responsible for mission success and reliability of the spacecraft. This spacecraft liquid propulsion system generally has a plurality of redundant configurations due to its importance.

As a redundant configuration, there has been known a redundant configuration that disposes a plurality of systems with the same or the same type of functions and configurations in the propulsion system. In contrast to this, there has also been known a redundant configuration that combines systems with different functions and configurations in order to suppress a uselessness caused by the redundancy. In the case of the latter, even when one system in the redundant systems has a failure, another system operates to compensate for excess or deficiency of a posture control amount in association with the failure. In view of this, while the uselessness caused by the redundancy is suppressed, there is a problem of difficulty in determining the presence/absence of a failure and a location of the failure from posture information.

In the case of a spacecraft, it is required to minimize the number of sensors for status monitoring that can be installed because of restricted resources of the weight, electric power, and the like. Therefore, the number of sensors used for a status amount monitor of the liquid propulsion system used for a failure diagnosis is also desired to be decreased as much as possible.

CITATION LIST

Patent Literature

Patent Literature 1: JP 60-60399 A
Patent Literature 2: JP 2002-161800 A

SUMMARY OF INVENTION

Technical Problem

The present invention is to provide a failure diagnostic system and a failure diagnostic method that enable to accurately diagnose a device failure in a spacecraft liquid propulsion system.

Solution to Problem

A failure diagnostic system for a spacecraft liquid propulsion system according to the present invention is a failure diagnostic system for a spacecraft liquid propulsion system that includes a plurality of thrusters, and a supply pipe connected to the thrusters. This system includes a pressure sensor that detects an inner pressure of the supply pipe as time-series data, a frequency spectrum conversion unit that converts the time-series data into data of a frequency spectrum, a storage unit that stores data of a frequency spectrum generated based on an analytical model by computer simulation or a test result of a testing device as a data set, a comparator that compares the data set with the data of the frequency spectrum generated by the frequency spectrum conversion unit, and a determining unit that determines a failure in any one of the plurality of thrusters according to a comparison result of the comparator.

A failure diagnostic method for a spacecraft liquid propulsion system according to the present invention, in which the spacecraft liquid propulsion system includes a plurality of thrusters and a supply pipe connected to the plurality of thrusters in the failure diagnostic method for the spacecraft liquid propulsion system, includes a step of obtaining an inner pressure of the supply pipe as time-series data, a step of converting the time-series data into data of a frequency spectrum, a step of preliminarily obtaining a data set of a frequency spectrum for a failure diagnosis, based on an analytical model by computer simulation or a test result of a testing device, and a step of diagnosing a presence/absence of a failure and a failure location in the thrusters based on a degree of similarity between the data of the frequency spectrum and the data set.

Advantageous Effects of Invention

According to the present invention, after the inner pressure of the supply pipe is obtained as the time-series data, this time-series data is converted into the data of the frequency spectrum. This data of the frequency spectrum is compared with the preliminarily obtained data set to diagnosis the presence/absence of a failure and the failure location in the propulsion system. This enables to provide the failure diagnostic system for the spacecraft liquid propulsion system and the failure diagnostic method for the spacecraft liquid propulsion system that enable to accurately diagnose a failure in a spacecraft.

DESCRIPTION OF EMBODIMENTS

The following describes embodiments with reference to the attached drawings. In the attached drawings, functionally the same components may be represented with the same number. Note that while the attached drawings illustrate embodiments and exemplary implementations according to the principle of the disclosure, these are for understanding the disclosure, and are never used for interpreting the disclosure in a limited way. Description in this description is merely a typical example, and is not to limit claims or application examples of the disclosure in any sense.

While in the embodiments, its description is made in detail sufficiently enough for a person skilled in the art to implement the disclosure, other implementations and configurations are possible, and it should be understood that changes in configurations and structures and replacement of various components are allowed without departing from a scope or a spirit of the technical idea of the disclosure. Accordingly, the subsequent description should not be interpreted in a limiting sense.

First Embodiment

Figure 1:
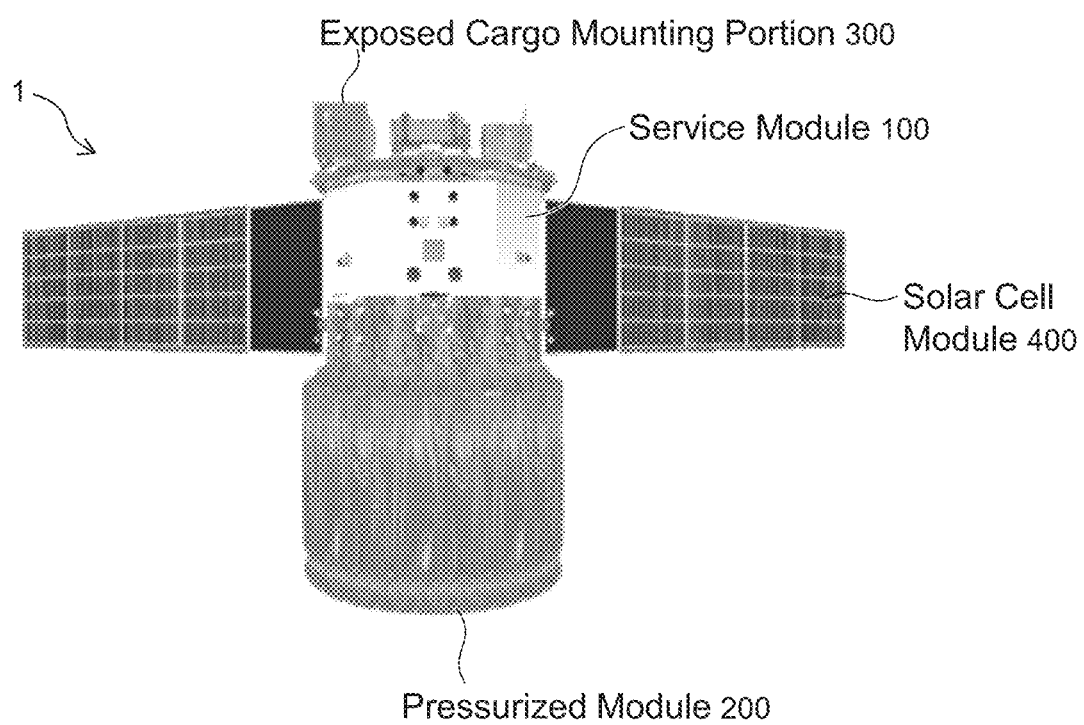
FIG. 1 is an external view illustrating a schematic configuration of a spacecraft 1 to which a spacecraft liquid propulsion system according to a first embodiment is applied.

With reference to FIG. 1 to FIG. 8, the following describes a failure diagnostic system and a failure diagnostic method for a spacecraft liquid propulsion system according to the first embodiment. An external view in FIG. 1 illustrates a schematic configuration of a spacecraft 1 to which the spacecraft liquid propulsion system according to the first embodiment is applied. The spacecraft 1 exemplarily illustrated in FIG. 1 is a H-II Transfer Vehicle for supplying goods to the International Space Station. This spacecraft 1 (the H-II Transfer Vehicle) is configured of a service module 100, a pressurized module 200, an exposed cargo mounting portion 300, and a solar cell module 400, as one example.

The service module 100 is a module to manage various kinds of controls of the spacecraft 1, and internally includes a communication module, an electric power supply module, a data processing module, a solar array wing system, a propulsion control module, and the like. The pressurized module 200 is a module that has a docking part to the International Space Station and includes pressurized supply goods. The exposed cargo mounting portion 300 is a portion to include outboard supply goods, and constitutes a part of the service module 100.

With reference to a schematic diagram in FIG. 2, a configuration of the propulsion control module (the spacecraft liquid propulsion system) included in the service module 100 will be described. This propulsion control module has a redundant configuration including a plurality of thrusters 101 (here, three thrusters 101A to 101C). The thrusters 101A to 101C are attached to a housing of the spacecraft 1 and are propulsion devices that provide a propulsion to the spacecraft 1 and control its position and posture. The three thrusters 101A to 101C have configurations different from one another, and while they simultaneously operate in a normal state, when any one of the thrusters has a failure, the rest of the thrusters are controlled to operate to compensate for the operation of the thruster with the failure.

In addition to this, this propulsion control module includes a fuel tank 102, an oxidant tank 103, a first supply pipe 104, a second supply pipe 105, a pressure sensor 106, and a control unit 107. The control unit 107 further includes an A/D converter 121, a sample hold circuit 122, a frequency spectrum conversion unit 123, a comparator 124, a determining unit 125, and a data set storage unit for failure diagnosis 126. The fuel tank 102 is a tank that stores a fuel to be supplied to the thrusters 101A to 101C. The oxidant tank 103 is a tank that stores an oxidant to be supplied to the thrusters 101A to 101C. The oxidant constitutes a propellant together with the fuel.

The first supply pipe 104 includes a main pipe and first branch pipes 104A to 104C that branch toward the three thrusters 101A to 101C from the main pipe. The second supply pipe 105 includes a main pipe and second branch pipes 105A to 105C toward the three thrusters 101A to 101C from the main pipe.

To each of the thrusters 101A to 101C, the fuel is supplied via the first supply pipe 104 from the fuel tank 102 and the oxidant is supplied via the second supply pipe 105 from the oxidant tank 103. The first supply pipe 104 and the second supply pipe 105 constitute a supply pipe that supplies the propellant (the fuel and the oxidant) to the thrusters 101A to 101C.

The first supply pipe 104 branches into the first branch pipes 104A to 104C as described above. Since the thrusters 101A to 101C are installed at different positions on the housing of the spacecraft 1, the first branch pipes 104A to 104C have their lengths L1 to L3 different from one another. The first branch pipes 104A to 104C may have different inner diameters, outer shapes, shapes, materials, and the like besides their lengths.

The second supply pipe 105 are also similarly branched into the second branch pipes 105A to 105C. Since the thrusters 101A to 101C are installed at different positions on the housing of the spacecraft 1, the second branch pipes 105A to 105C have their lengths L1' to L3' different from one another. The second branch pipes 105A to 105C may have different inner diameters, outer shapes, shapes, materials, and the like besides their lengths.

The first supply pipe 104 includes a valve V1 at a position in an upstream with respect to a branch point and includes valves V1a to V1c in the first branch pipes 104A to 104C. The second supply pipe 105 includes a valve V2 at a position in an upstream with respect to a branch point and includes valves V2a to V2c in the second branch pipes 105A to 105C.

The pressure sensor 106 detects a pressure at a position in the main pipe of the second supply pipe 105, that is, at a position in the upstream with respect to the branch point of the second branch pipes 105A to 105C. The pressure sensor 106 may detect a pressure in the first supply pipe 104 instead of (or in addition to) the second supply pipe 105. In this embodiment, one pressure sensor detects the pressure at the position in the upstream with respect to the branch point by a method described later, thereby enabling to diagnose the presence/absence of a failure of the plurality of thrusters. Mounting a plurality of the pressure sensors in a spacecraft increases a weight of the spacecraft, thereby causing a disadvantage of less loadable supply goods by that amount. To analyze signals from the plurality of pressure sensors, a load on a computer is also increased, thereby causing a disadvantage of an increased size of a data processing module. In this embodiment, one sensor is configured to be able to detect an abnormality of the plurality of thrusters, thereby enabling to reduce the load on the data processing module as well as enabling to increase the loadable supply goods.

The A/D converter 121 converts a detection signal from the pressure sensor 106 into a time series of digital signal. The time series of digital signal is temporarily held in the sample hold circuit 122. The frequency spectrum conversion unit 123 converts the time series of digital signal temporarily held in this sample hold circuit 122 into frequency spectral data. The conversion into the frequency spectral data can be executed using a well-known high-speed Fourier transformation (FFT). This frequency spectral data is compared in the comparator 124 with a data set stored in the data set storage unit for failure diagnosis 126.

The data set stored in the data set storage unit for failure diagnosis 126 is a data collection of a signal from the pressure sensor 106 assumed for a case of a failure occurrence in any one of the thrusters 101A to 101C.

As described above, the second branch pipes 105A to 105C (and/or the first branch pipes 104A to 104C) connected to the thrusters 101A to 101C have different respective lengths (and/or inner diameters, outer diameters, shapes, materials, and the like). In view of this, the signal from the pressure sensor 106 assumed for the case of a failure occurrence in any one of the thrusters 101A to 101C is different from signals from the pressure sensor 106 assumed for cases of any one of the other thrusters have a failure.

Therefore, in this embodiment, the frequency spectral data of the signal from the pressure sensor 106 assumed for the case of a failure occurrence in any one of the thrusters 101A to 101C is preliminarily obtained based on an analytical model obtained by simulation and/or an operation of a testing machine (a test result), and is stored in the data set storage unit for failure diagnosis 126 as the data set. The comparator 124 calculates degrees of similarity by comparing the data of the frequency spectrum of the signal obtained from the pressure sensor 106 of the spacecraft 1 with the data set stored in the data set storage unit for failure diagnosis 126, and identifies the closest data (which has a high degree of similarity). Based on this identification result, the determining unit 125 can determine which one of the thrusters 101A to 101C has a failure in the determining unit 125. The determination in the comparator 124 can be performed using well-known pattern matching and clustering.

Figure 2:
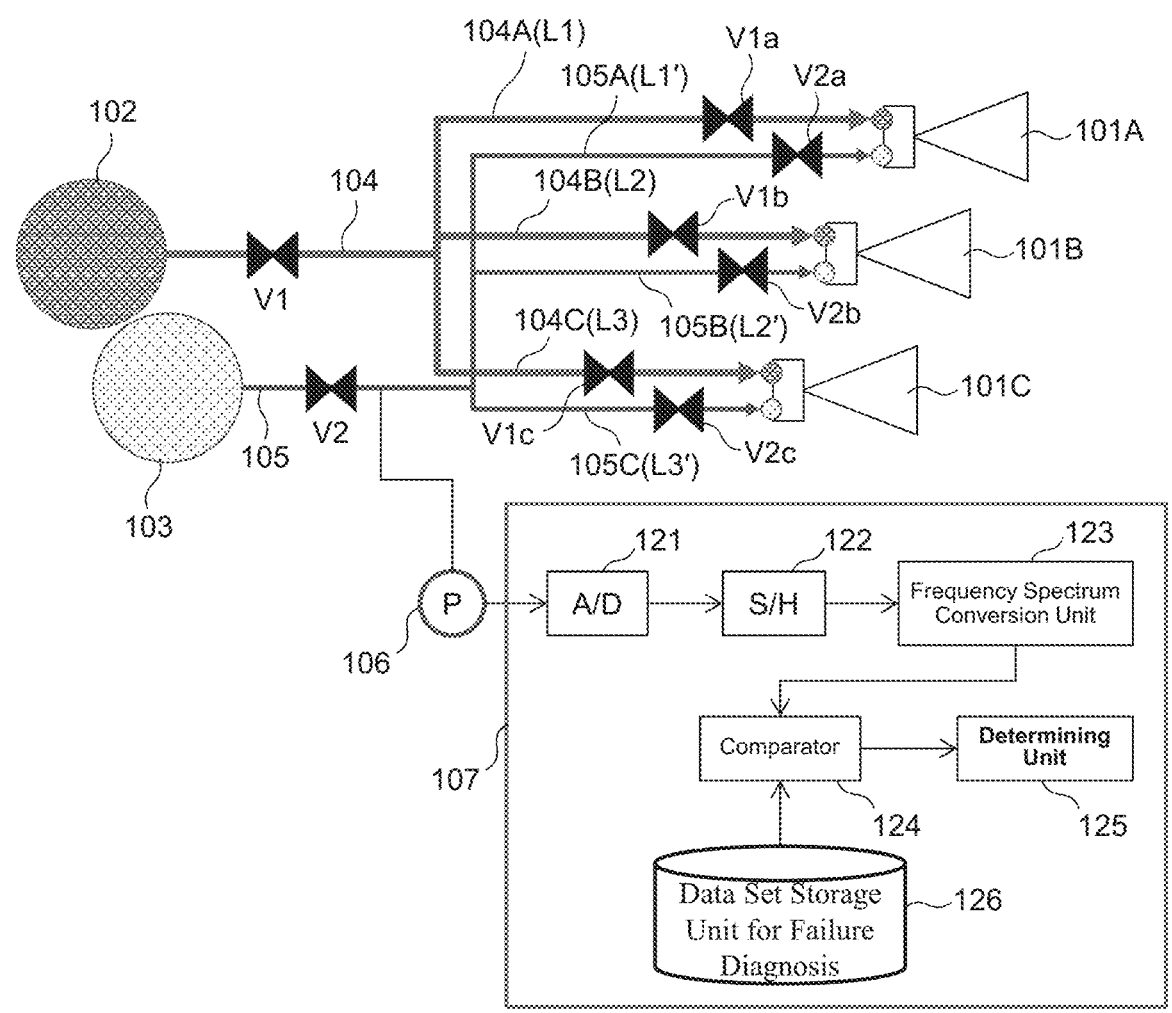
FIG. 2 is a schematic diagram describing a configuration of a propulsion control module (a spacecraft liquid propulsion system) included in a service module 100.
Figure 3:
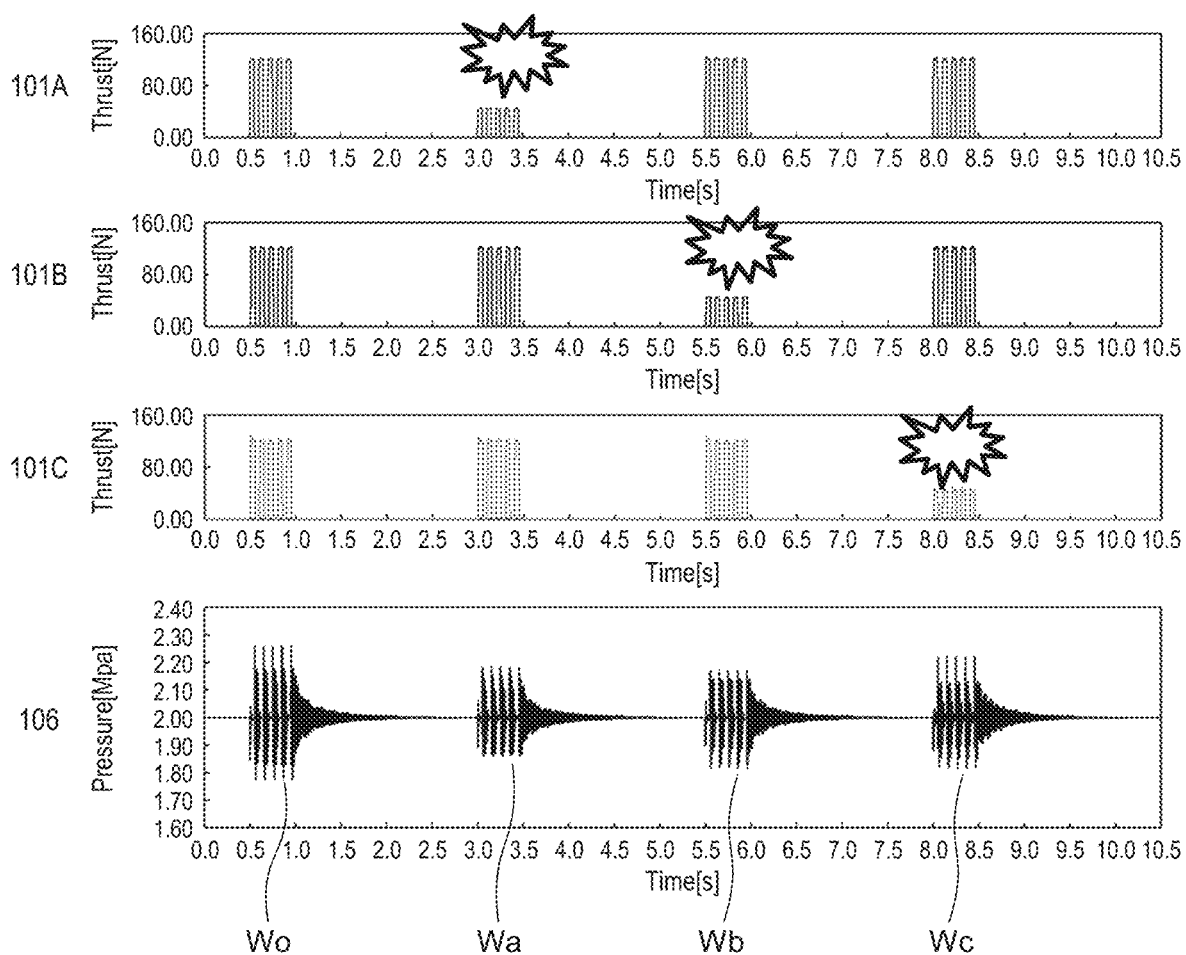
FIG. 3 is waveform diagrams illustrating exemplary fuel injection pulse signals of respective thrusters 101A to 101C and exemplary time series of a detection signal from a pressure sensor 106.

FIG. 3 illustrates exemplary fuel injection pulse signals of the respective thrusters 101A to 101C and a time series of detection signal from the pressure sensor 106. In FIG. 3, a waveform Wo is an exemplary waveform obtained by simulating when all the thrusters 101A to 101C normally operate, a waveform Wa is an exemplary waveform obtained by simulating when a failure occurs in the thrusters 101A, a waveform Wb is an exemplary waveform obtained by simulating when a failure occurs in the thrusters 101B, and a waveform Wc is an exemplary waveform obtained by simulating when a failure occurs in the thrusters 101C. The shapes of the detection signals from the pressure sensor 106 are different depending on which one of the thrusters 101A to 101C has a failure. This is based on the differences in lengths and the like between the branch pipes 105A to 105C in addition to the mutually different structures of the thrusters 101A to 101C. However, in the spacecraft 1 and the propulsion system as illustrated in FIGS. 1 and 2, the diagnosis based on the time series of data has a large amount of data and the calculation is complicated because responses from a plurality of the systems are combined.

Therefore, in this embodiment, this time series of detection signal from the pressure sensor is converted into a signal of frequency spectrum. On the other hand, also in the data set storage unit for failure diagnosis 126, the time series of signal is stored as the data set after being converted into the frequency spectral data. The data set stored in the data set storage unit for failure diagnosis 126 is generated based on the analytical model obtained by simulating normal/failure states on a computer (simulation) as described later. In addition to this, the data obtained based on the analytical model is verified based on frequency spectral data obtained using the testing machine. The data after the verification is stored in the data set storage unit for failure diagnosis 126 as the data set.

Figure 4:
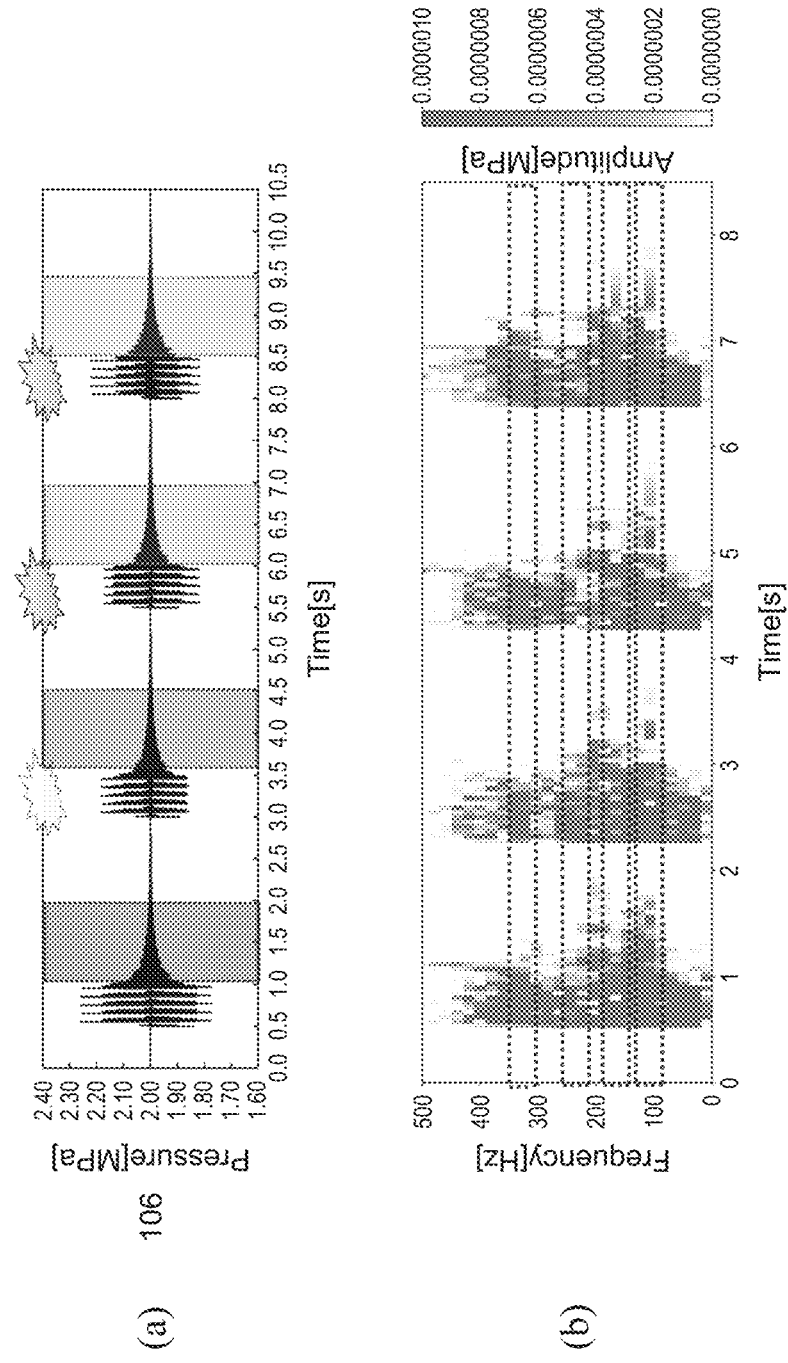
FIG. 4 illustrates an exemplary graph (b) when time series pressure data (a) of the signal measured by the pressure sensor 106 is converted into a time series of frequency data.
Figure 5:
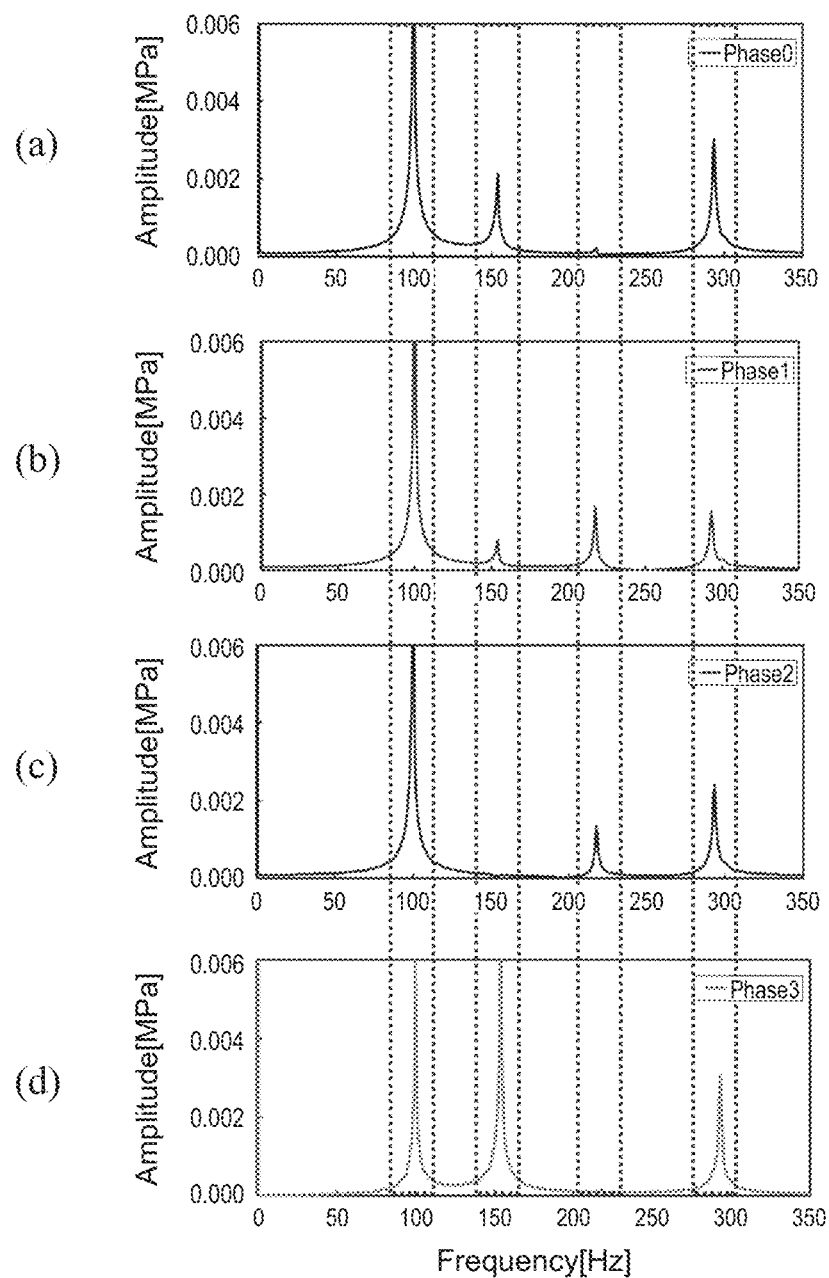
FIG. 5 illustrates exemplary graphs of frequency spectra generated based on the graphs in FIGS. 4(a) and 4(b).

FIG. 4 illustrates an exemplary graph (b) when time series pressure data (a) of a signal measured by the pressure sensor 106 is converted into a time series of frequency data. FIG. 5 illustrates exemplary graphs of the frequency spectra generated based on the graphs in FIGS. 4(a) and 4(b). FIGS. 5(a) to 5(d) illustrate data of frequency spectra corresponding to time series of transient response data of the detection signal from the pressure sensor 106, after a state where the fuel is injected at a predetermined pulse period to the thrusters 101A to 101C (a first state) ends, and a state where the pulse is stopped (a second state) is started. In FIG. 5, (a) is an exemplary frequency spectrum when all the thrusters 101A to 101C normally operate, (b) is an exemplary frequency spectrum when the thruster 101A has a failure, (c) is an exemplary frequency spectrum when the thruster 101B has a failure, and (d) is an exemplary frequency spectrum when the thruster 101C has a failure.

As is clear from FIGS. 5(b) to 5(d), when the thruster with a failure differs, a frequency at which a peak appears, amplitude values, the number of peaks (the number of peaks having an amplitude equal to or more than a predetermined threshold), and the like in the graphs of the frequency spectra differ. Thus, in the frequency spectra (FIG. 5), clear differences are exhibited in shapes of the signals compared with the time series of signal (FIG. 4). Therefore, comparing the data set of the frequency spectra stored in the data set storage unit for failure diagnosis 126 with the frequency spectrum obtained from the detection signal from the pressure sensor 106 enables to determine which thruster has a failure precisely and based on little data.

Figure 6A:
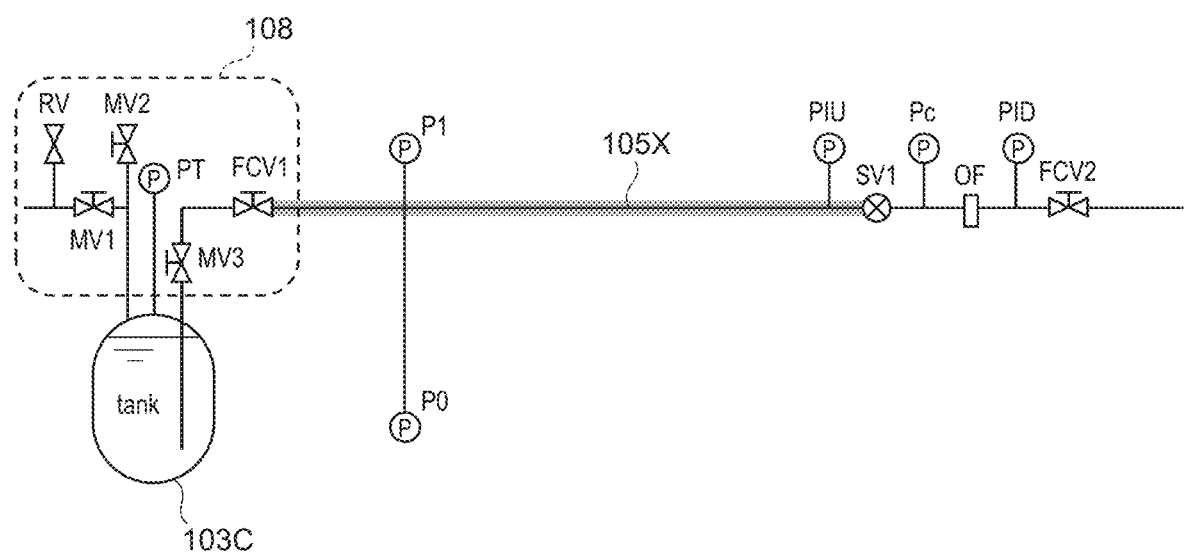
FIG. 6A is an exemplary testing device used for generating a data set stored in a data set storage unit for failure diagnosis 126.
Figure 6B:
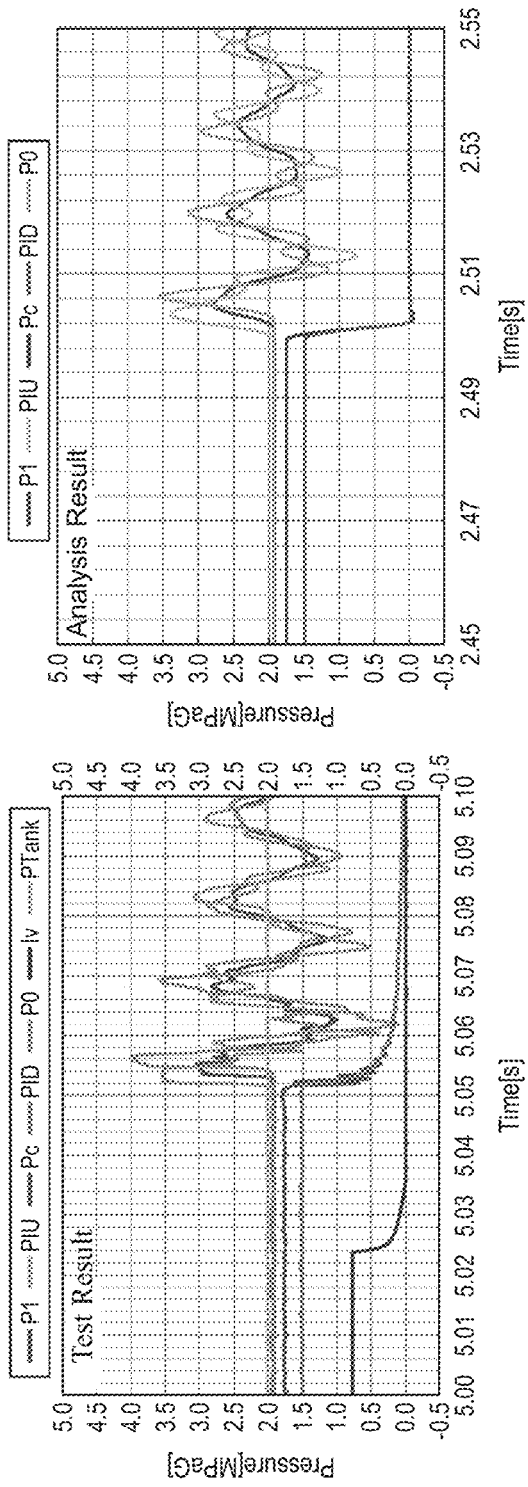
FIG. 6B is a graph illustrating exemplary test results obtained by the testing device and an exemplary analysis results obtained by an analytical model.
Figure 6C:
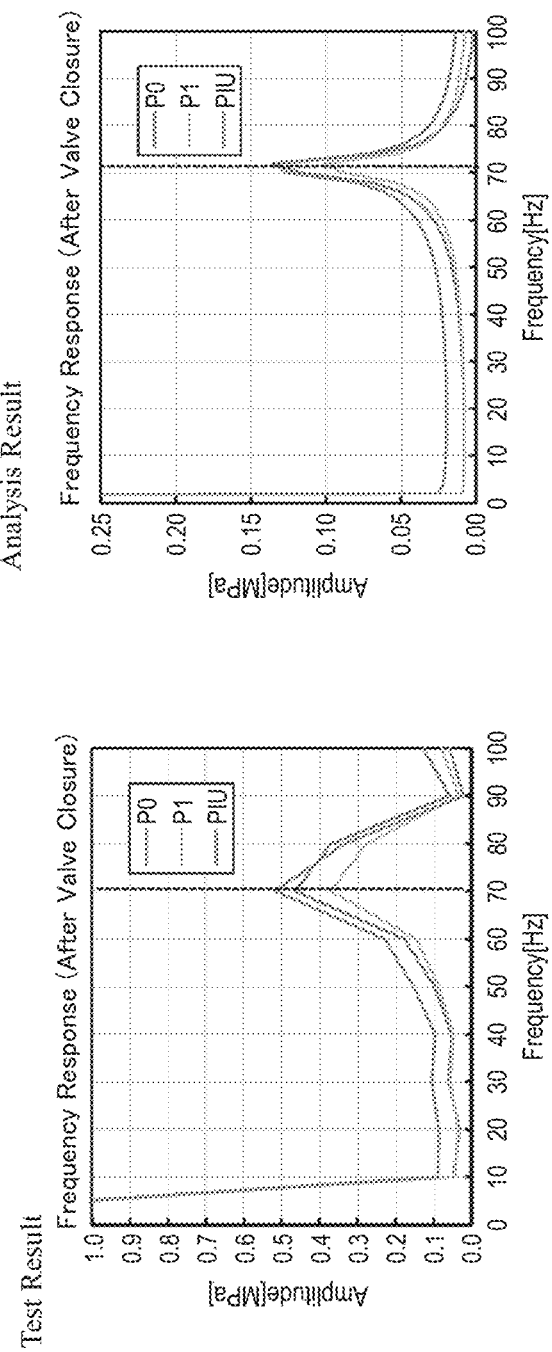
FIG. 6C is a graph illustrating exemplary test results obtained by the testing device and an exemplary analysis results obtained by an analytical model.

With reference to FIGS. 6A to 6C, a procedure for generating the data set to be stored in the data set storage unit for failure diagnosis 126 will be described. The data set for failure diagnosis can be obtained using an analytical model by computer simulation. Furthermore, for example, checking a test result obtained using a testing device as illustrated in FIG. 6A (left side graphs in FIG. 6B and FIG. 6C) and an analysis result obtained based on the analytical model (right side graphs) enables to confirm validity of the analytical model.

The testing device exemplarily illustrated in FIG. 6A includes a tank 103C, a supply pipe 105X, a supply adjusting device 108, pressure sensors P0, P1, Pc, PIU, and PID, a solenoid valve SV1, and a flow rate control valve FCV2, and an orifice OF. The supply adjusting device 108 includes valves RV, MV1 to MV3, a pressure sensor PT, and a flow rate control valve FCV1. The tank 103C corresponds to the fuel tank 102 and/or the oxidant tank 103 in the spacecraft 1, and the supply pipe 105X corresponds to the first supply pipe 104 and the second supply pipe 105 in the spacecraft 1. The solenoid valve SV1 corresponds to the valves V1, V2, V1a to V1c, V2a to V2c in the spacecraft 1.

The pressure sensors P0 and P1 are pressure sensors corresponding to the pressure sensor 106 in FIG. 2, and measure a pressure of a liquid flowing in the supply pipe 105X. The pressure sensors PIU, Pc, and PID are pressure sensors for measuring a pressure loss in the solenoid valve SV1.

Figure 7:
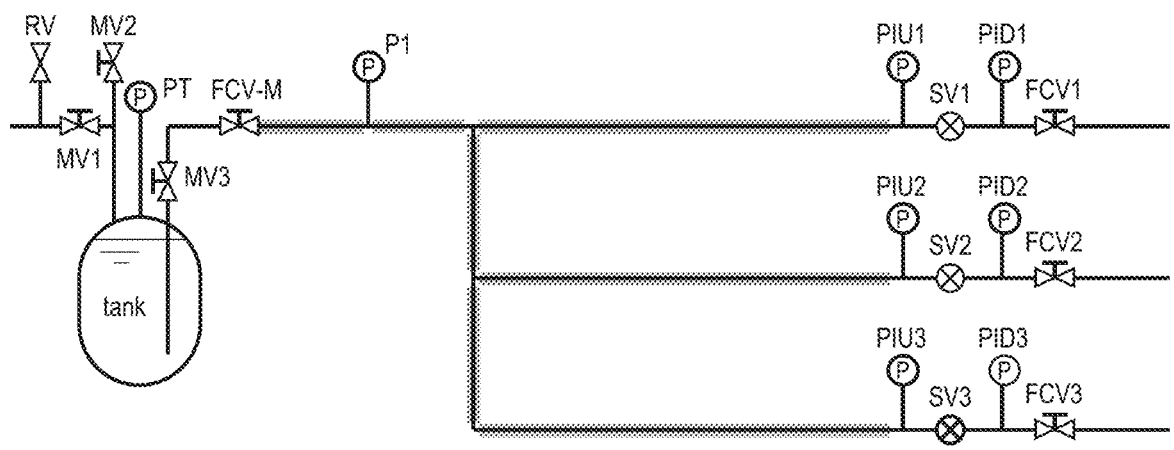
FIG. 7 is another example of a testing device used for generating a data set stored in the data set storage unit for failure diagnosis 126.

While FIG. 6A is the testing device that simulates one branch pipe and one thruster in the spacecraft 1, it is needless to say that it is possible to use a testing device that simulates three branch pipes and three thrusters to further approximate the structure of the spacecraft 1 in FIG. 2 as illustrated in FIG. 7.

Figure 8:
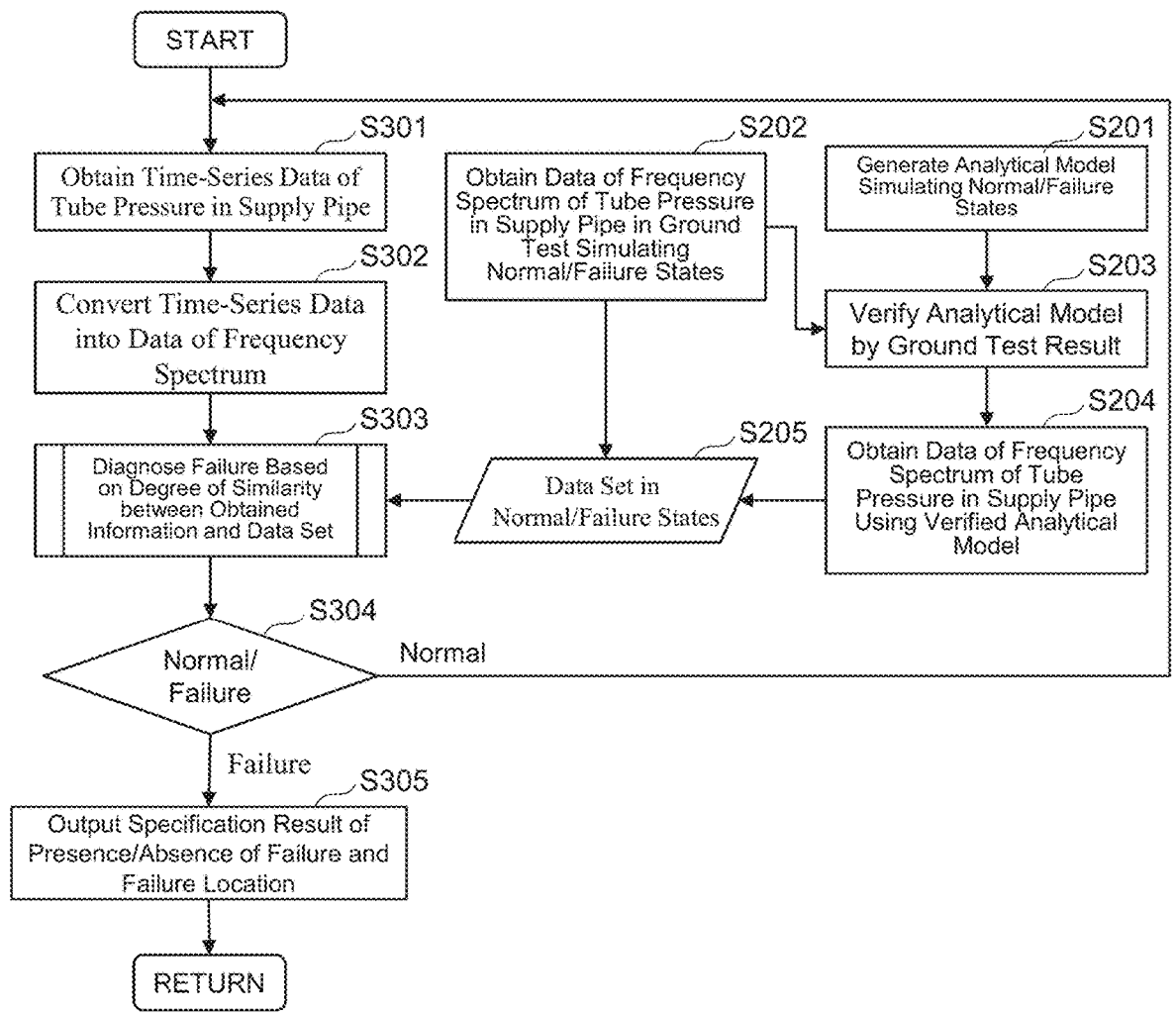
FIG. 8 is a flowchart describing an operation (a failure diagnostic method) of a failure diagnostic system according to the first embodiment.

With reference to the flowchart in FIG. 8, an operation of the failure diagnostic system (a failure diagnostic method) according to the first embodiment will be described. In this system of the first embodiment, the data set for a failure diagnosis of the thrusters are preliminarily generated, and this data set is compared with the frequency spectral data of the signal detected by the pressure sensor 106 installed in the spacecraft 1, thus determining the presence/absence and a location of a failure in the thrusters. The procedure of the generation of the data set for the failure diagnosis is performed at Steps S201 to 205 in FIG. 8, and the determination of a failure in the thrusters in the spacecraft 1 is performed at Steps S301 to 305.

At Step S201, an analytical model that simulates a normal state/failure state of the spacecraft 1 is created by computer simulation.

On the other hand, at Step S202, for example, using a testing device as illustrated in FIG. 6A or FIG. 7, a ground test simulating the normal state/failure state of the spacecraft 1 is performed to obtain time-series data of inner pressure of the supply pipe and data of a frequency spectrum.

At Step S203, based on the test result by the testing device obtained at Step S202, validity of the analytical model made at Step S201 are verified.

At subsequent Step S204, using the analytical model whose validity has been verified at Step S203 is used to obtain data of a frequency spectrum of a tube pressure in the supply pipe. The obtained data is stored in the aforementioned data set storage unit for failure diagnosis 126 as a preliminary information group (a data set) for determining the normal state/failure state of the spacecraft 1. The preparation of the failure diagnosis of the thrusters in the spacecraft 1 is thus completed.

At Step S301, the pressure sensor 106 in the spacecraft 1 obtains time-series data of a tube pressure in the supply pipe 105. At Step S302, the frequency spectrum conversion unit 123 converts the obtained time-series data of the pressure into data of a frequency spectrum.

At Step S303, the obtained information obtained based on the pressure sensor 106 is compared with the data set stored in the data set storage unit for failure diagnosis 126 to determine a degree of similarity between the data in the data set and the obtained information. When data that indicates a high degree of similarity is identified in the data set, the presence/absence of a failure and the failure location in the thrusters are identified based on the data. When it is determined that there is no failure ("normal" at Step S304), the procedure returns to Step S301, and the above-described procedure is repeated. When it is determined that there is a failure ("failure" at Step S304), the identification result of the presence/absence of the failure and the location of the failure is output at Step S305.

As described above, with the system and the method in the first embodiment, the time-series data detected by the pressure sensor 106 is converted into the frequency spectral data, and this is compared with the preliminarily obtained data set for failure diagnosis, and thus, the failure diagnosis is performed. Accordingly, even in a spacecraft that has a redundant configuration in which systems with different functions and configurations are combined, the presence/absence of a failure and the failure location can be accurately determined without posture information. Disposing the pressure sensor in the upstream of the branching unit of the supply pipe enables to determine a failure of the plurality of thrusters with the small number of sensors.

Second Embodiment

Figure 9:
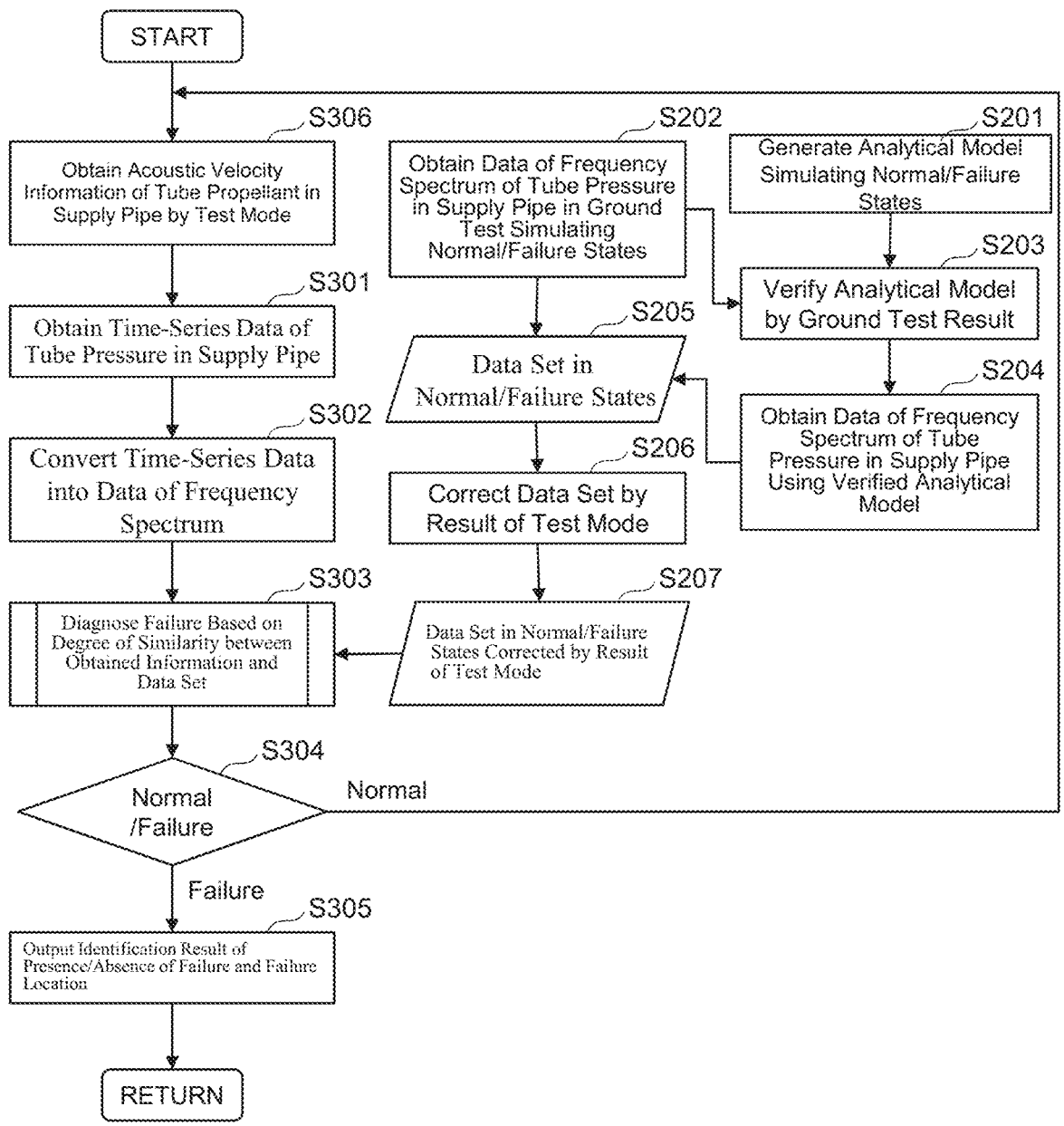
FIG. 9 is a flowchart describing an operation (a failure diagnostic method) of a failure diagnostic system according to a second embodiment.

With reference to FIG. 9, a failure diagnostic system and a failure diagnostic method for a spacecraft liquid propulsion system according to the second embodiment will be described. The overall configuration of the failure diagnostic system of the spacecraft liquid propulsion system according to this second embodiment may be similar to that of the first embodiment (FIG. 2). However, in the system and method in this second embodiment, in addition to detecting a pressure by the pressure sensor 106, an acoustic velocity of a tube fluid is calculated based on a response frequency of the detected pressure and known lengths of the pipes. Based on the calculated acoustic velocity, the data set to be stored in the data set storage unit for failure diagnosis 126 is corrected.

By measuring the acoustic velocity of the tube fluid of the second supply pipe 105 (and/or the first supply pipe 104), it is possible to obtain changes in acoustic velocity caused by a gas dissolved in the propellant that fills inside the pipe. Based on this change in acoustic velocity, the data set is corrected, thereby enabling to improve accuracy of failure diagnosis.

With reference to the flowchart in FIG. 9, an operation of the failure diagnostic system (a failure diagnostic method) according to the second embodiment will be described. In the system in this second embodiment, similarly to the first embodiment, the data set for failure diagnosis of the thrusters is preliminarily generated, this data set is compared with the frequency spectral data of the signal detected by the pressure sensor 106 installed in the spacecraft 1, and the presence/absence and the location of a failure in the thrusters are determined. The procedure for generating the data set for failure diagnosis is performed at Steps S201 to S207, and the determination of a failure in the thrusters in the spacecraft 1 is performed at Steps S301 to S305, S306.

Since Steps S301 to 305 are the same as those in the first embodiment, the overlapping descriptions are omitted. Since the procedure for generating the data set at Steps S201 to 205 is the same as that in the first embodiment, the overlapping descriptions are omitted. In this second embodiment, at Step S306 prior to Step S301, an acoustic velocity of the tube propellant in the supply pipe 105 is calculated in accordance with detected information by the pressure sensor 106 by test mode. Based on this information on the acoustic velocity, the data set is corrected at Step S206. At Step S207, this data set is stored in the data set storage unit for failure diagnosis 126 and is provided for a failure diagnosis similarly to the first embodiment.

Third Embodiment

Figure 10:
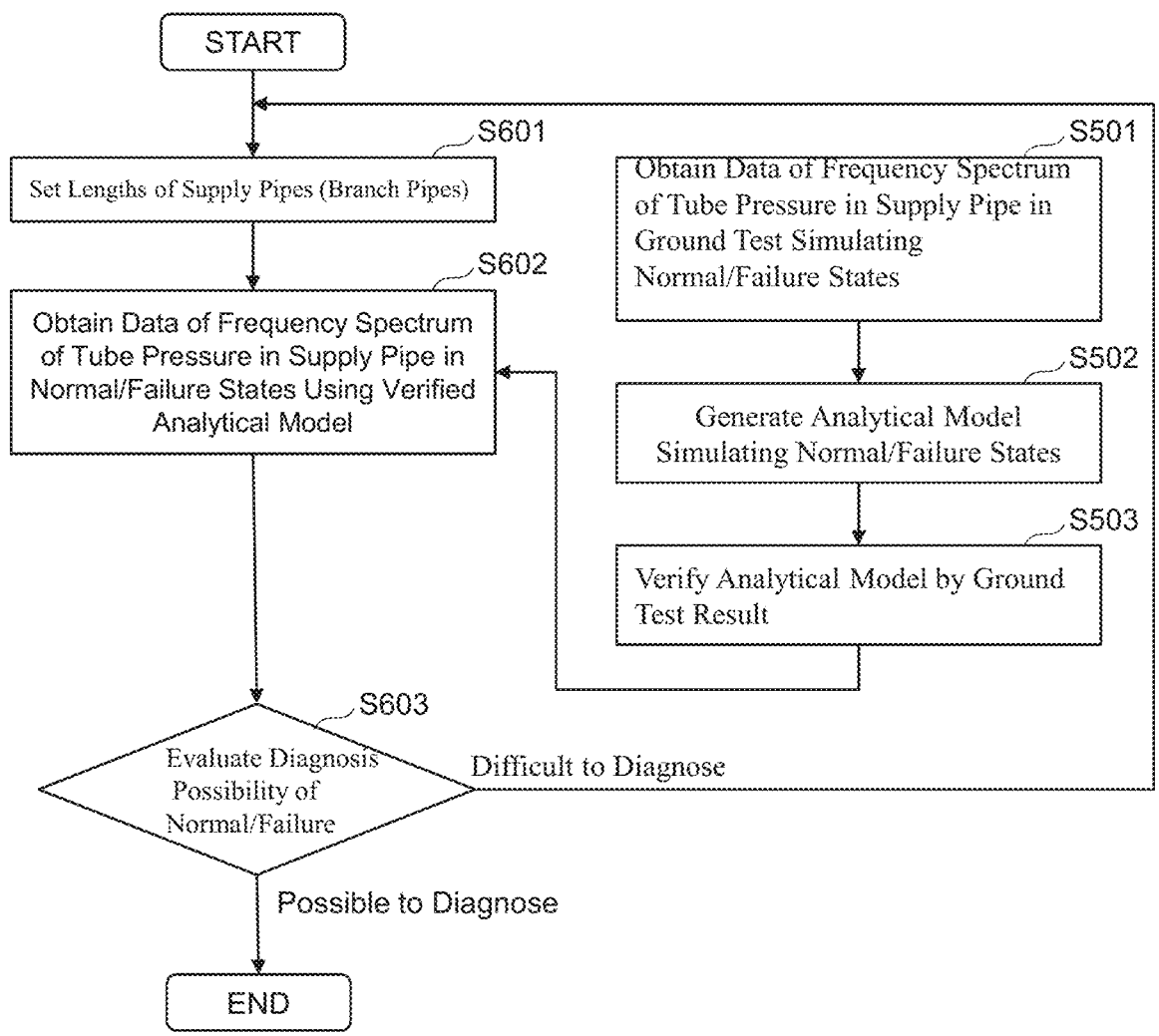
FIG. 10 is a flowchart describing an operation (a failure diagnostic method) of a failure diagnostic system according to a third embodiment.

With reference to FIG. 10, a failure diagnostic system and a failure diagnostic method of a spacecraft liquid propulsion system according to the third embodiment will be described. The overall configuration of the failure diagnostic system of the spacecraft liquid propulsion system in this third embodiment may be similar to that of the first embodiment (FIG. 2). The execution procedure of the failure diagnosis may be similar to that of the first embodiment. However, the system and method in this third embodiment include a procedure to set a length (in particular, a length of each branch pipe) of the second supply pipe 105 (and/or the first supply pipe 104) and evaluate a possibility of failure diagnosis in the set length, which is different from the first embodiment.

The methods in the first and second embodiments identify the presence/absence of a failure and the failure location of the plurality of thrusters by using the changes in waveforms of the frequency spectra caused by the different lengths of the supply pipes to the plurality of thrusters. However, when the lengths of the plurality of branch pipes are in, what is called, a harmonic relation, the waveforms of the frequency spectra possibly do not differ. Therefore, the third embodiment includes a procedure to appropriately set the lengths of the supply pipes.

With reference to a flowchart in FIG. 10, a determination method for diagnosis possibility of normal/failure in the third embodiment will be described. First, at Step S501, using a testing device as illustrated in FIG. 6A or FIG. 7, a ground test simulating the normal state/failure state of the spacecraft 1 is performed to obtain time-series data of inner pressure of the supply pipe and data on a frequency spectrum. At subsequent Step S502, an analytical model simulating the normal state/failure state of the spacecraft 1 are created by computer simulation. At Step S503, according to the result of the ground test at Step S501, validity of the analytical model is verified.

After the analytical model is verified at Step S501 to S503, the lengths of the supply pipes (the branch pipes) are set at Step S601. At Step S602, on the premise of these set lengths of the supply pipes (the branch pipes), using the verified analytical model, data of a frequency spectrum of a tube pressure in the supply pipe in the normal state/failure state (all the plurality of thrusters are normal or any one has a failure) is obtained.

When the lengths of the supply pipes are appropriately set, the waveform of the frequency spectrum (peak position, amplitude, the number of peaks, and the like) when one thruster of the plurality of thrusters has a failure is different from the waveforms of the frequency spectra when another thruster has a failure. However, when there is no difference in waveforms, the setting of the lengths of the supply pipes is inappropriate, and it is possible that the method of this embodiment is incapable of performing an appropriate failure diagnosis. In view of this, at Step S603, the obtained waveforms of many frequency spectra are analyzed to determine whether normal/failure diagnosis is capable or not. When it is determined that the diagnosis is difficult, the procedure returns to Step S601, the lengths of the supply pipes are set to different lengths, and the similar operations are repeated.

The present invention is not limited to the above-described embodiments and includes various modifications. For example, the above-described embodiments are explained in detail for easy understanding of the present invention, and do not necessarily include all the explained configurations. A part of the configuration of one embodiment can be replaced by the configuration of another embodiment, and the configuration of one embodiment can be used with the addition of the configuration of another embodiment. Additionally, for a part of the configurations in the respective embodiments, another configuration can be added, deleted, or replaced.

For example, while in the above-described embodiments, the analytical model based on the computer simulation is verified using the test result obtained by the testing device, when it is certified that the reliability of the analytical model obtained as the result of the computer simulation is high, it is possible to omit the verification based on the test result by the testing device. On the other hand, when it is recognized that the testing device accurately reproduces the actual machine, it is also possible to generate the data set in accordance only with the test result of the testing device.

REFERENCE SIGNS LIST

1 Spacecraft
100 Service module
200 Pressurized module
300 Exposed cargo mounting portion
400 Solar cell module
101A to 101C Thruster
102 Fuel tank
103 Oxidant tank
103C Tank
104 First supply pipe
104A to 104C First branch pipe
105 Second supply pipe
105A to 105C Second branch pipe
105X Supply pipe
106 Pressure sensor
107 Control unit
108 Supply adjusting device
121 A/D converter
122 Sample hold circuit
123 Frequency spectrum conversion unit
124 Comparator
125 Determining unit
126 Data set storage unit for failure diagnosis
FCV1 to 2 Flow rate control valve
MV1 Valve
P0, P1, Pc, PID, PIU, PT Pressure sensor

The invention claimed is:

1. A failure diagnostic system for a spacecraft liquid propulsion system including a plurality of thrusters, and a supply pipe connected to the thrusters, the failure diagnostic system comprising:
the plurality of thrusters;
the supply pipe connected to the thrusters, wherein the supply pipe includes a main pipe and branch pipes branching toward the plurality of thrusters from the main pipe;
a pressure sensor that detects an inner pressure of the supply pipe as time-series data;
a frequency spectrum conversion unit that converts the time-series data into first frequency spectrum data;
a storage unit that stores second frequency spectrum data generated based on an analytical model by simulation executed by a computer or a test result of a testing device as a data set;

a comparator that compares the data set with the first frequency spectrum data generated by the frequency spectrum conversion unit; and a determining unit that determines a failure in any one of the plurality of thrusters according to a comparison result of the comparator;

wherein the computer is configured to, in generating the data set:
receive settings of lengths of the branch pipes connected to the thrusters;
determine whether a length of the supply pipe is capable of diagnosis of normal state or failure state of the thrusters based on the second frequency spectrum generated based on the analytical model or the test result of the testing device; and
change a setting of the length of the supply pipe when the length of the supply pipe is determined not to be capable of the diagnosis.

2. The failure diagnostic system for the spacecraft liquid propulsion system according to claim 1,
wherein the comparator compares third frequency spectrum data corresponding to time series of transient response data of a detection signal from the pressure sensor after an operation on the thruster has transitioned from a first state to a second state with the data set.

3. The failure diagnostic system for the spacecraft liquid propulsion system according to claim 1,
wherein the pressure sensor is disposed in the main pipe.

4. The failure diagnostic system for the spacecraft liquid propulsion system according to claim 3,
wherein the comparator compares third frequency spectrum data corresponding to time series of transient response data of a detection signal from the pressure sensor after an operation on the thruster has transitioned from a first state to a second state with the data set.

5. The failure diagnostic system for the spacecraft liquid propulsion system according to claim 1,
wherein the data set stored by the storage unit comprises verified data obtained by verifying the second frequency spectrum data generated based on the analytical model based on third frequency spectrum data obtained using the testing device.

6. The failure diagnostic system for the spacecraft liquid propulsion system according to claim 1,
wherein the data set stored by the storage unit comprises corrected data obtained by correcting the second frequency spectrum data generated based on the analytical model based on an acoustic velocity of a tube propellant in the supply pipe.

7. A failure diagnostic method for a spacecraft liquid propulsion system, wherein the spacecraft liquid propulsion system includes a plurality of thrusters and a supply pipe connected to the plurality of thrusters, the failure diagnostic method comprising:

obtaining an inner pressure of the supply pipe as time-series data, wherein the supply pipe includes a main pipe and branch pipes branching toward the plurality of thrusters from the main pipe;
converting the time-series data into first frequency spectrum data;
preliminarily obtaining a data set comprising second frequency spectrum data for a failure diagnosis, the second frequency spectrum data generated based on an analytical model by a simulation executed by a computer or a test result of a testing device; and
diagnosing a presence/absence of a failure and a failure location in the thrusters based on a degree of similarity between the first frequency spectrum data and the data set;
wherein obtaining the data set comprises:
receiving settings of lengths of the branch pipes connected to the thrusters;
determining whether a length of the supply pipe is capable of diagnosis of normal state or failure state of the thrusters based on the second frequency spectrum generated based on the analytical model or the test result of the testing device; and
changing a setting of the length of the supply pipe when the length of the supply pipe is determined not to be capable of the diagnosis.

8. The failure diagnostic method according to claim 7,
wherein the degree of similarity is determined by comparing third frequency spectrum data corresponding to time series of transient response data of a detection signal from the pressure sensor after an operation on the thruster has transitioned from a first state to a second state, with the data set.

9. The failure diagnostic method according to claim 7,
wherein an inner pressure of the main pipe is obtained as time-series data.

10. The failure diagnostic method according to claim 9,
wherein the degree of similarity is determined by comparing third frequency spectrum data corresponding to time series of transient response data of a detection signal from the pressure sensor after an operation on the thruster has transitioned from a first state to a second state, with the data set.

11. The failure diagnostic method according to claim 7,
wherein the data set comprises verified data obtained by verifying the second frequency spectrum data generated based on the analytical model based on third frequency spectrum data obtained using the testing device.

12. The failure diagnostic method according to claim 7,
Wherein the data set comprises corrected data obtained by correcting the second frequency spectrum data generated based on the analytical model based on an acoustic velocity of a tube propellant in the supply pipe.

* * * * *